March 17, 1964      L. A. DEVER ETAL      3,124,910
HYDRAULIC SYSTEM FOR CONTROLLED MOVEMENT OF MACHINE TOOL MEMBER
Filed July 10, 1962                                   2 Sheets-Sheet 1
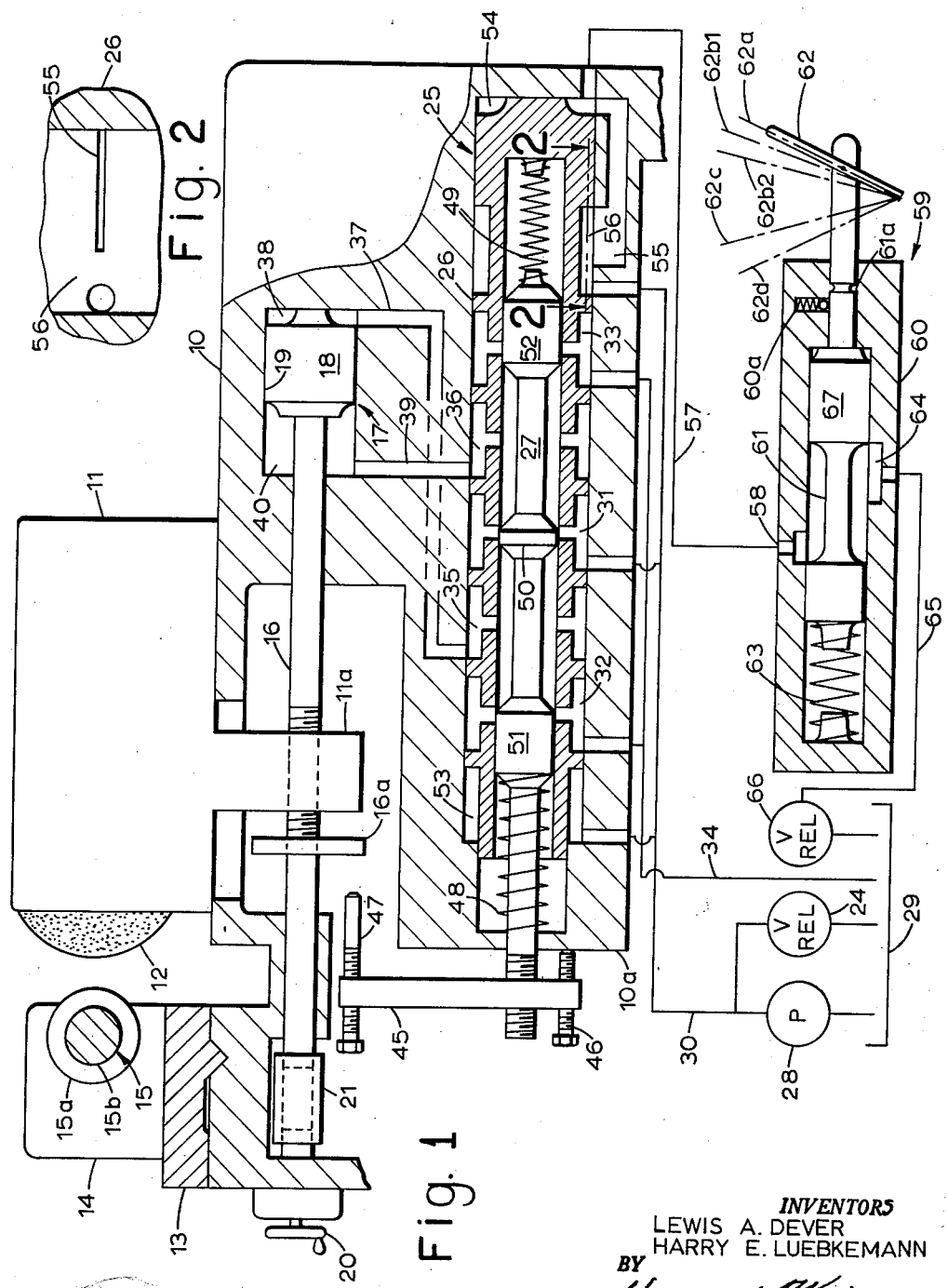
INVENTORS
LEWIS A. DEVER
HARRY E. LUEBKEMANN
BY
ATTORNEYS

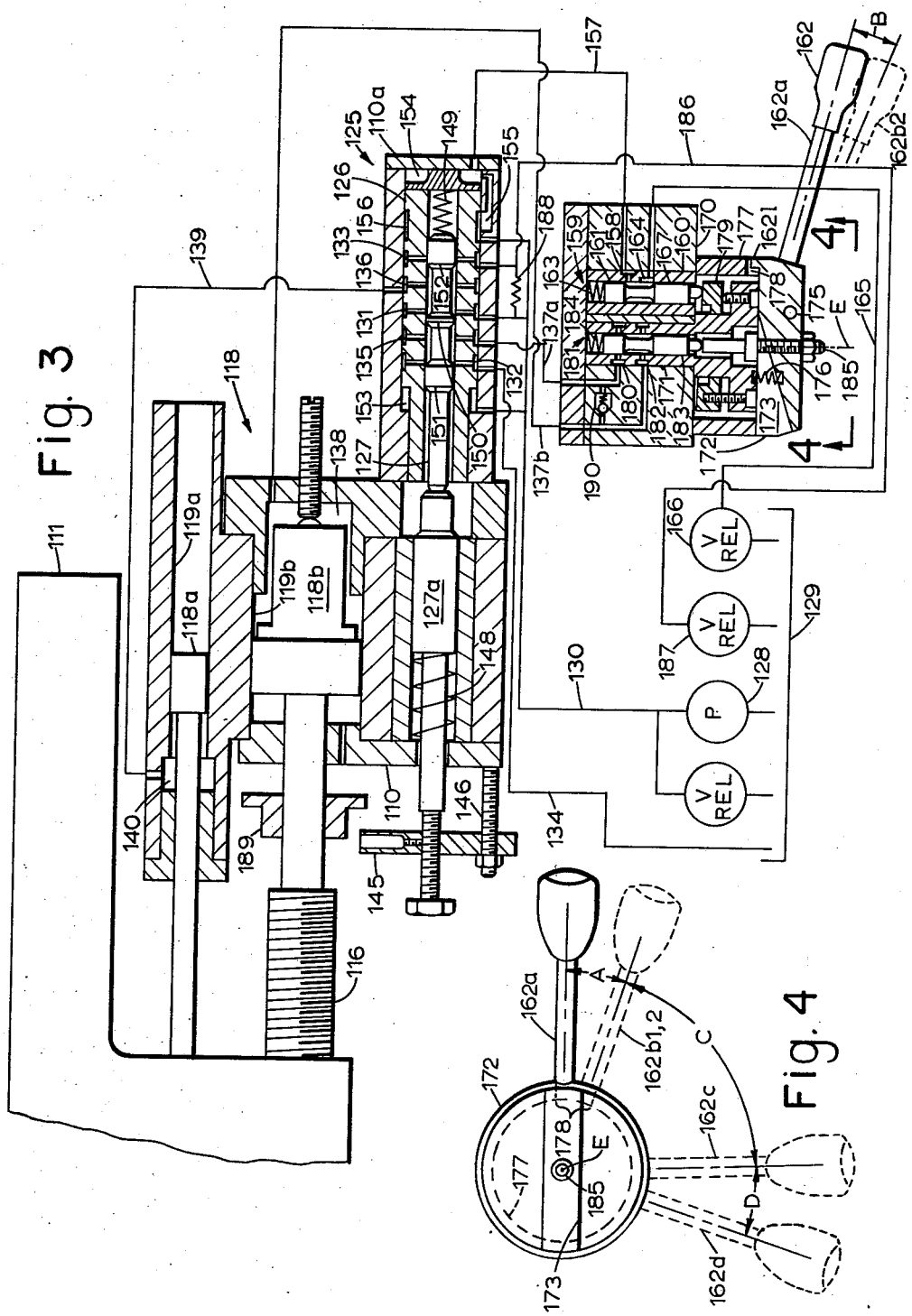

United States Patent Office 3,124,910
Patented Mar. 17, 1964

3,124,910
HYDRAULIC SYSTEM FOR CONTROLLED MOVE-
MENT OF MACHINE TOOL MEMBER
Lewis A. Dever and Harry E. Luebkemann, Cincinnati,
Ohio, assignors to The Cincinnati Milling Machine Co.,
Cincinnati, Ohio, a corporation of Ohio
Filed July 10, 1962, Ser. No. 208,705
13 Claims. (Cl. 51—165)

The present invention relates to a hydraulic system for controlled movement of a machine tool member particularly suitable for the manual remote control of the member in a grinding machine which is moved through a cycle to effect a grind on a workpiece.

In many instances in machine tool operation, it is desirable to move a machine tool member, such as a grinding machine wheelhead in a plunge grind operation, a predetermined distance at a relatively rapid rate, as for rapid advance of the grinding wheel up to the work, and then effect a slow, carefully controlled movement of the member through a relatively short movement, as for feeding the grinding wheel into the work.

In the present invention there is provided a hydraulic system for movement of a machine tool member particularly suitable for the remote manual control of a member, such as a wheelhead, during a grinding cycle. In the preferred form of the invention, the position of a control lever determines the rate of movement of the wheelhead during the portion of the cycle when the wheelhead is approaching the work so the operator, by manipulation of the lever, has full control over the rate of rapid advance of the wheelhead toward the work, and can stop the rapid advance at any point if, for example, there is a question of clearance with a shoulder on the work, or some other obstruction. The same control lever is effective, after the completion of the rapid advance movement, to control the position of the wheelhead, the instantaneous position of the control lever corresponding to an instantaneous position of the wheelhead, so that the operator, by moving the control lever at a selected rate, moves the wheelhead into the work at a selected rate and against a positive stop. The control lever operates mechanism which is connected only hydraulically to other portions of the system so that, when convenience requires a remote location of the control lever, neither electrical nor mechanical transmission of control movements are required.

It is therefore one object of the present invention to provide an improved hydraulic system for control of the movement of a machine tool member. It is another object of the present invention to provide an improved hydraulic system for remote manual control of a machine tool member. It is still another object of the present invention to provide an improved hydraulic system in a grinding machine for remote manual control of the rate of movement of a machine member during initial rapid advance in the grinding cycle followed by manual control of the position of said member during final feeding movement thereof.

In the drawings:

FIG. 1 is a schematic representation, partly in cross-section, of a hydraulic system constructed in accordance with the present invention as utilized in a grinding machine, some portions of the system being greatly enlarged for clarity;

FIG. 2 is a view taken on the line 2—2 of FIG. 1;

FIG. 3 is a schematic representation, partly in cross-section, of a hydraulic system constructed in accordance with another, preferred, embodiment of the present invention; and FIG. 4 is a view taken on the line 4—4 of FIG. 3.

There is shown in FIG. 1 a hydraulic system for the controlled movement of a grinding machine wheelhead relative to a workpiece during a plunge grind cycle. The base 10 has a wheelhead 11 mounted thereon which rotatably carries a grinding wheel 12. A table 13 is slidably mounted on the base and carries a headstock 14 which rotatably supports a workpiece 15. The wheelhead has a depending portion 11a, threadedly engaged with a feed shaft 16 which is moved axially without rotation by a motor, indicated at 17, to move the wheelhead towards and away from the workpiece. The motor consists of a piston 18, on shaft 16, slidably received in a cylindrical bore 19 in the base, and, in each grinding operation, the piston moves against the forward end of the bore which defines a positive stop determining the final forward position of the grinding wheel 12 in each grind cycle. For grinding different size workpieces, the position of the wheelhead 11 on the shaft 16 can be adjusted, during setup, by rotation of handwheel 20 which is connected to the shaft 16 through the spline connection 21.

There is mounted in the base 10 a hydraulic valve, indicated generally at 25, which may be considered a motor valve for operation of motor 17. The valve 25 has two movable valve members, a sleeve 26 and plunger 27. The sleeve 26 is slidably received in the valve housing 10a, which may be a portion of the base 10, and the plunger 27 is slidably received in the sleeve 26. The sleeve 26 has a plurality of longitudinally extending external annular grooves which define ports, each adapted to connect to a fluid passage in the housing in any position of the sleeve in the housing. A pump 28 takes fluid from sump 29 and delivers it under pressure to pressure line 30, relief valve 24 being connected to line 30 and discharging to the sump to determine the maximum pressure in line 30. One of the sleeve grooves constitutes a pressure groove 31 continuously connected to the pressure line 30 and two of the other sleeve grooves 32, 33, which straddle the pressure port, constitute exhaust grooves continuously connected to a return line 34 leading to the sump. The two annular external grooves positioned between the pressure and exhaust ports, respectively, constitute motor grooves 35, 36. The motor groove 35 is continuously connected by line 37 to the motor chamber 38 in bore 19 behind piston 18, and the motor groove 36 is continuously connected by line 39 to the motor chamber 40 in front of piston 18. The grooves 31, 32, 33, 35, and 36 are each in communication through a radial passage with the interior of the sleeve 26.

The plunger 27 extends outside the housing and has a bracket 45 connected thereto. Bracket 45 carries an adjustable set screw 46 positioned to engage the housing, and an adjustable set screw 47 positioned for engagement by the collar 16a on shaft 16 as the shaft and wheelhead advance. The compression spring 48, engaged with the housing and the plunger, urges the plunger rearwardly to the extent permitted by set screw 46, and the compression spring 49, considerably lighter than spring 48, is engaged with the plunger 27 and the closed rearward end of sleeve 26 to urge the sleeve to its extreme rearward position in the housing. The plunger 27 has three spools 50, 51, and 52 thereon which are spaced apart to correspond to the spacing between the radial sleeve passages connected to the pressure groove 31 and the exhaust grooves 32, 33, respectively. When the sleeve 26 and plunger 27 are in neutral relationship with the spools 50, 51, 52 aligned, respectively, with the radial passages of grooves 31, 32, and 33 to block these grooves, the motor grooves 35, 36 are isolated from pressure and exhaust to stop the motor. The sleeve 26 and plunger 27 are displaced from neutral relationship when both the sleeve and plunger are in their extreme rearward position as shown in FIG. 1.

The sleeve 26 at the forward end thereof defines an annular chamber 53 with the housing 10a, continuously connected to pressure line 30, and the fluid under pressure in the chamber 53 exerts a substantially constant force on the sleeve urging the sleeve rearwardly. The closed rearward end of the sleeve defines a chamber 54 with the housing, and fluid under pressure in chamber 54 exerts a force on the sleeve urging the sleeve forwardly. The effective area of the sleeve 26 exposed in chamber 53, which always contains fluid at the pressure in line 30, is less than the area of sleeve 26 exposed in chamber 54 (as, for example, 60 percent of the area exposed in chamber 54) so that when the pressure in chamber 54 is that percentage of the line pressure, the opposing forces on the sleeve 26 will be equal and the sleeve 26 will be in equilibrium.

The housing 10a has a narrow elongated slot 55 in communication with chamber 54. When the sleeve 26 is in its extreme rearward position in the housing 10a, the full length of the slot 55 is exposed to pressure line 30 through a groove 56 in sleeve 26 which, with the sleeve in this position, terminates at the rear end of slot 55. Chamber 54 is connected by line 57 to the inlet port 58 of a hydraulic control valve 59. Control valve 59 has a housing 60 which slidably receives a movable valve member 61 connected to a pivotal control lever 62. The valve member 61, and lever 62, are biased to a retracted position by spring 63. The valve 59 has a slot 64 in the housing 60, identical in length and width to slot 55 in housing 10a, which is connected to line 65 terminating in relief valve 66 at the sump. The valve member 61 has a spool 67 thereon which terminates at the rear end of slot 64 when the lever 62 and valve member 61 are in the fully retracted position as shown in FIG. 1 and, with the valve member 61 in this position, the full length of slot 64 is exposed to the inlet port 58. Since valve 59 is connected only hydraulically to the rest of the system, the valve 59 can be located in any convenient location, remote from the wheelhead motor and valve 25, if necessary, as, for example, at the front of base 10 with the control handle 62 adjacent handwheel 20.

The pressure in groove 56 of sleeve 26 is at all times at the pressure of line 30 as determined by relief valve 24, say, for example, 250 pounds per square inch, and the pressure in line 65 is at the pressure determined by relief valve 66, say, for example, 50 pounds per square inch. The narrow slots 55 and 64 define two restrictions to flow of hydraulic fluid connected in series between groove 56 and line 65. Whenever the cross-sectional areas of these restrictions (as slot 55 is viewed in FIG. 2) through which fluid can flow are equal, regardless of the size of the cross-sectional areas, the portion of the system between the two restrictions (including chamber 54) will be at a pressure half way between the pressure in groove 56 and the pressure in line 65. With the pressures used for illustrative purposes, the pressure in chamber 54 will be 150 pounds per square inch when the cross-sectional areas of slots 55 and 64 are equal. Since the pressure in chamber 53 will remain at 250 pounds per square inch, and the pressure in chamber 54 is 150 pounds per square inch (or 60 percent of the pressure in chamber 53) whenever the effective cross sectional areas of slots 55 and 64 are equal, the opposing forces on the sleeve 26 will be equal and the sleeve 26 will be in equilibrium.

When the handle 62 is displaced to the left, the effective area of slot 64 is reduced by spool 67, and the pressure in line 57 and chamber 54 rises momentarily. Since the pressure in chamber 53 is constant, an unbalance of forces on the sleeve 26 is created which shifts the sleeve to the left as viewed in FIG. 1. The shifting of sleeve 26 to the left, however, reduces the effective area of slot 55 and reduces the pressure in chamber 54. When the effective area of slot 55 is equal to the effective area of slot 64, the pressure in chamber 54 will be restored to its original value and the forces on the sleeve 26 will be balanced to stop movement of the sleeve. Thus the sleeve 26 always moves proportionally to movement of plunger 61 and hence proportionally to movement of control lever 62. If the slots 55 and 64 are of the same width, the movement of sleeve 26 will equal movement of plunger 61; if the slot 55 is greater or less in width than the slot 64, the movement of sleeve 26 will be less or more, respectively, than the movement of plunger 61 since movement of sleeve 26 stops when the effective areas of the slots are equal.

When the system is in the condition shown in FIG. 1 with the lever 62 in the fully retracted position 62a, pressure line 30 is connected through valve 25 to chamber 40 of motor 17 and chamber 38 is connected to return line 34 through the valve to hold the feed shaft 16 and wheelhead 11 in the fully retracted position. Displacement of the control lever 62 to a position 62b2, where the ball of detent 60a engages groove 61a on plunger 61, will effect displacement of sleeve 26 to the left a corresponding amount. Since the spring 49 is not strong enough to move the plunger against spring 48 a corresponding amount, pressure groove 31 in sleeve 26 will be connected to motor groove 35 and fluid under pressure will be introduced to chamber 38 through line 37. At the same time chamber 40 is connected to exhaust through line 39, motor groove 36, discharge groove 33, and return line 34. Thus the pressure conditions on motor 17 are reversed and the piston advances to advance the wheelhead and grinding wheel at a rate determined by the displacement of sleeve 26, which, in turn, is determined by the displacement of control lever 62. During this portion of the operating cycle in which the grinding wheel is rapidly advanced to the work, the position of control lever 62 does not correspond to a position of the wheelhead or grinding wheel but, instead, corresponds to a rate at which the wheelhead and grinding wheel are advanced. If the wheelhead must be stopped during rapid advance to check, for example, the clearance of the grinding wheel with a shoulder on the workpiece, such as the shoulder 15a adjacent the portion 15b of the workpiece to be ground, the lever 62 is retracted to position 62b1 where the sleeve 26, which follows the movement of lever 62, is in neutral relationship with plunger 27 to stop the motor 17. Subsequent advance of lever 62 from position 62b1 toward position 62b2 will effect resumption of advance of the wheelhead 11 and grinding wheel 12 at a rate determined by the instantaneous position of the lever, the lever at position 62b1 corresponding to a zero rate and the lever at position 62b2 corresponding to a desired maximum rate.

The screw 47 is set for contact by the collar 16a on feed shaft 16 as the grinding wheel 12 approaches the portion 15b of the workpiece to be ground. When a mechanical connection is effected between the wheelhead 11 and plunger 27 through depending portion 11a, shaft 16, collar 16a, screw 47, and bracket 45, the plunger moves to left as viewed in FIG. 1 until the plunger 27 is in neutral relationship with the sleeve 26 (that is, the spools 50, 51, 52 again block grooves 31, 32, 33) to stop the motor. This stops the wheelhead 11 and movement of the plunger 27. After connection is effected between the wheelhead and the plunger to bring the plunger 27 into neutral relationship with the sleeve 26, further movement of the wheelhead for feeding the grinding wheel into the work can be effected only by movement of the lever 62 to the left. Since any displacement of lever 62 to the left causes a corresponding displacement of sleeve 26 to the left, and any displacement of sleeve 26 to the left effects only a momentary operation of motor 17 until plunger 27 resumes a neutral relationship with sleeve 26, the position of the wheelhead 11 will correspond to the position of handle 62, and, to continuously feed the grinding wheel into the work, the handle must be continuously moved to the left at a rate corresponding to the rate at which the operator wishes the grinding wheel to penetrate the work. When the handle is in position 62c, the piston 18 will be against the positive stop defined by the forward end of bore 19 and the workpiece portion will be down to size. The handle 62 is moved to its extreme forward position 62d to effect a final displacement of sleeve 26 relative to plunger 27 to maintain fluid under pressure in chamber 38 and urge the piston against the positive stop for spark out. Retraction of lever 62 effects movement of sleeve 26 to the right and retraction of wheelhead 11.

In the embodiment of the invention shown in FIG. 3, the rate of movement of the wheelhead during rapid advance is controlled differently than in the embodiment of FIG. 1. In this embodiment the motor connected to the wheelhead, indicated generally at 118, has two pistons 118a and 118b, each received in bores, 119a and 119b, respectively. Piston 118b is connected to feed shaft 116 threadedly received in the wheelhead 111 and piston 118a is connected directly to the wheelhead. Cylinder 118a and bore 119a define a chamber 140, and cylinder 118b and bore 119b define a chamber 138. When fluid under pressure from pump 128 is applied through pressure line 130 to chamber 140, and chamber 138 is simultaneously connected to the sump 129, the wheelhead 111 is retracted. When chamber 138 is connected to the pressure line 130, the wheelhead 111 advances despite the fact that some pressure is maintained in chamber 140 to eliminate backlash between the wheelhead and the feed shaft.

The hydraulic valve indicated generally at 125 has two movable valve members, sleeve 126 and plunger 127, which are similar to the sleeve and plunger of valve 25. Sleeve 126 has pressure groove 131, discharge grooves 132, 133, and motor grooves 135, 136, all continuously connected to lines terminating in the housing 110a. As in the previous embodiment, the sleeve 126 defines two chambers 153 and 154 with the valve housing 110a, and the housing 110a has a narrow slot 155 therein. Chamber 153, in which a smaller area of sleeve 126 is exposed than in chamber 154, is continuously in communication with pressure line 130. Fluid is admitted to chamber 154 from pressure line 130 through groove 156 in sleeve 126 and slot 155 in housing 110a. Fluid escapes from chamber 154 through line 157.

The valve housing 110a is mounted in the base 110, and a valve plunger extension member 127a is slidably received in the base and has a bracket 145 secured thereon. The bracket 145 has a set screw 146 thereon to limit the rearward movement of member 127a which is biased rearwardly by spring 148. Spring 149, which is considerably weaker than spring 148, serves to urge plunger 127 into continuous engagement with member 127a and to urge sleeve 126 rearwardly.

The remote control mechanism is mounted in a housing 170 which may be mounted in a convenient location. Axle 171 is rotatably mounted in housing 170 for rotation on axis E, and has a circular hub 172 connected thereto. The hub 172 has a diametrical slot 173 to receive the control lever 162 which is rotatable with the hub but pivotally connected to the hub by pin 175 for rocking movement relative thereto. Since hub 172 is free to rotate, the lever can be moved by the operator in a circumferential direction (as indicated by arrows A, C, and D) and, since the lever is pivotally mounted in slot 173, can be moved transversely to that direction, as indicated by arrow B. Lever 162 is biased inwardly by spring 176. A ring 177 mounted on the housing concentric with the axis E of rotation of hub 172 has an arcuate circumferentially extending slot 178 therein which receives a lug 162l on lever 162 and arrests movement of lever 162 at position 162b1 as it is rotated clockwise from an extreme counterclockwise position 162a. When the lever is pulled out, from position 162b1 to position 162b2, however, the lug 162l clears ring 177 and lever may again be swung clockwise to the extreme clockwise position 162d with the lug riding on ring 177 to hold the lever in its outer position.

The housing 170 has a valve 159 mounted therein, corresponding to valve 59 in the embodiment of FIG. 1, comprising a bushing 160 fixed in the housing and a plunger 161 slidably received in the bushing. The bushing has a narrow slot 164 therein, equal in cross-sectional area to the slot 155 when the sleeve 126 and plunger 161 are in the fully retracted positions shown. The bushing has an inlet port 158 connected to line 157 and fluid flowing through the valve and slot 164 is discharged through line 165 and relief valve 166 to the sump. The axle 171 has a cam 179 secured thereto and plunger 161, which has a spool 167 thereon, is urged against the cam by spring 163. Since the slots 155 and 164 are connected in series between the source of pressure and the sump, and the chamber 154 is between the slots, the axial position of valve plunger 161 determines the axial position of sleeve 126 in the same manner the position of plunger 61 determined the position of sleeve 26 in the embodiment of FIG. 1. The axial position of plunger 161 is determined, through cam 179, by the angular position of the lever 162 and when the lever is in position 162a, as shown in solid lines in FIGS. 3 and 4, the leading edge of spool 167 is at the edge of slot 164 and the sleeve 126 is fully retracted as shown with the edge of groove 156 at the edge of slot 155.

Like the embodiment of FIGS. 1 and 2, the sleeve 126 and valve plunger 127 are not in neutral relationship when both the sleeve and plunger are fully retracted, as shown in FIG. 3. The sleeve is to the right of a position where the pressure and exhaust grooves thereof would be simultaneously blocked by the spools 150, 151, 152, respectively of plunger 127, and fluid under pressure is supplied from pressure line 130 through pressure groove 131, motor groove 136, and line 139 to chamber 140. Motor groove 135 is connected by line 137a to one external annular groove 180 of a throttle valve 181, and the other external annular groove 182 of the throttle valve is connected by line 137b to chamber 138. Throttle valve 181 is contained in axle 171 and has a movable valve member 183 biased into engagement, by spring 184, with a stud 185 mounted in lever 162 on the axis E of rotation thereof. When lever 162 is held in its normal inner position by spring 176, stud 185 holds valve member 183 in a position to block flow between grooves 180 and 182. As lever 162 is pulled outwardly, flow occurs between grooves 180 and 182, increasing to a maximum when lever 162 is at its extreme outer position.

Thus when control lever 162 is in position 162a, sleeve 126, plunger 127, and wheelhead 111 are in their fully retracted positions as shown. When, as indicated by arrow A, lever 162 is thrown to position 162b1 where lug 162l engages the end of slot 178, valve member 161 is advanced by cam 179 and sleeve 126 is shifted to the left of a position where it would be in neutral relationship with plunger 127. At this time, pressure groove 131 is connected to line 137a and motor groove 136 is connected to discharge groove 133. Discharge groove 133 is connected to the sump through line 186 containing a relief valve 187 to maintain some pressure in chamber 140 for elimination of backlash. Line 186 is connected to pressure line 130 through a high resistance 188 for replacement of fluid lost through leakage.

With the lever in position 162b1, the system is conditioned for rapid advance of the wheelhead. By movement of the lever 162 from the position 162b1 toward the position 162b2, as indicated by arrow B, the throttle valve member 183 will be moved against the bias of spring 184 to permit a selected rate of flow to chamber 138 of the wheelhead motor. The force exerted on piston 118b by the fluid under pressure in chamber 138 is much greater than force exerted by the fluid under the lesser pressure in chamber 140 and rapid advance of the wheelhead begins. The motor can be stopped by returning lever 162 to position 162b1, or advanced at maximum speed by moving the lever to position 162b2 and, during this portion of the operating cycle, the lever 162, moving in arc B, controls the rate of advance. When collar 189 on feed shaft 116 engages bracket 145, the plunger 127 shifts into neutral relationship with the sleeve 126 and the motor stops. The operator then, with the lever out, turns the lever clockwise, as indicated by arrow C. From position 162b2 to position 162c, the lug 1621 rides on ring 177 to hold the lever out and to hold the valve member 183 fully open so that the motor groove 135 is continuously in communication with chamber 138. As the lever is moved from position 162b2 to position 162c, the cam 179 advances valve member 161 and the sleeve 126 advances a corresponding amount in the same manner the sleeve 26 advances in response to advance of valve member 61. Thus, the movement of the wheelhead corresponds to the position of the lever as in the embodiment of FIG. 1 when lever 62 moved from position 62b to position 62c, and the wheelhead will be fully advanced when the lever is in position 162c. Further movement of the lever, as indicated by arrow D, to position 162d advances valve member 161 by means of cam 179 to advance sleeve 126 and urge the piston 118b against the forward end of the cylinder for spark out. When the lever 162 is turned counterclockwise the wheelhead retracts. A check valve 190 inserted between lines 137a and 137b permits fluid from chamber 138 to by-pass the throttle valve 181 as it flows to motor groove 135 and through the motor valve to discharge groove 132 and return line 134.

We claim:

1. A hydraulic system for controlled movement of a machine tool member comprising in combination:
   (a) a hydraulic motor connected to said member to effect movement thereof,
   (b) a first hydraulic valve hydraulically connected to the motor, said valve having two movable valve members positionable relative to each other in neutral relationship to stop the motor,
   (c) a second hydraulic valve having a movable valve member, said second hydraulic valve hydraulically connected to said first hydraulic valve to displace one of the valve members thereof from neutral relationship with the other valve member thereof on displacement of the valve member of the second hydraulic valve, and
   (d) means to move said other valve member of the first hydraulic valve toward neutral relationship with said one valve member in response to movement of said machine tool member after a predetermined movement of the machine tool member.

2. A hydraulic system for controlled movement of a machine tool member comprising in combination:
   (a) a hydraulic motor connected to said member to effect movement thereof,
   (b) a first hydraulic valve hydraulically connected to the motor, said valve having two movable valve members positionable relative to each other in neutral relationship to stop the motor,
   (c) a source of fluid under pressure,
   (d) means including at least one fluid chamber connected to the source of fluid under pressure and in communication with one of said valve members of the first hydraulic valve to apply opposing forces to said one valve member,
   (e) a second hydraulic valve hydraulically connected to said chamber and operable to alter the pressure therein and create an unbalance of said opposing forces, said one valve member of the first hydraulic valve shifting from neutral relationship relative to the other valve member of the first hydraulic valve in response to an unbalance of said forces,
   (f) means responsive to movement of said one valve member of the first hydraulic valve to reduce the unbalance of said forces thereon, and
   (g) means to effect connection between said machine tool member and said other valve member of the first hydraulic valve after predetermined movement of said machine tool member to move said other valve member of the first hydraulic valve toward neutral relationship with said one valve member.

3. A hydraulic feed system for the remote manual control of relative feed movement between a tool carrying member and a workpiece supporting member in a machine tool comprising:
   (a) a hydraulic motor connected to one of said members to effect movement thereof relative to the other of said members,
   (b) a first hydraulic valve hydraulically connected to the motor, said valve having two movable valve members positionable relative to each other in neutral relationship to stop the motor, said valve having a fluid chamber in communication with one of said valve members,
   (c) a source of fluid under pressure and a sump,
   (d) means defining a passage from the source of fluid under pressure to said chamber and defining a passage from said chamber to said sump,
   (e) means providing a force on said one valve member of said first hydraulic valve opposing the force applied thereto by fluid in said chamber,
   (f) a second hydraulic valve remote from said motor connected in one of said passages and having a movable valve member to define a variable restriction therein, said second hydraulic valve having a lever to move the valve member thereof and change the pressure in said chamber, said one valve member of the first hydraulic valve shifting from neutral relationship relative to the other valve member of the first hydraulic valve in response to an unbalance of said opposing forces,
   (g) means responsive to movement of said one valve member of the first hydraulic valve to reduce the unbalance of said forces thereon, and
   (h) means to effect a mechanical connection between said other valve member and said one machine tool member after a predetermined movement of said one machine tool member to move said other valve member of the first hydraulic valve toward neutral relationship relative to said one valve member.

4. A hydraulic feed system for the remote manual control of relative feed movement between a tool carrying member and a workpiece supporting member in a machine tool comprising:
   (a) a hydraulic motor connected to one of said members to effect movement thereof relative to the other of said members,
   (b) a source of fluid under pressure and a sump,
   (c) a first hydraulic valve hydraulically connected between the motor and the source of fluid under pressure, said valve having two movable valve members positionable relative to each other in neutral relationship to stop the motor, said valve having a first fluid chamber in communication with one of said valve members and connected to the source of fluid under pressure to apply a constant force against said one valve member, said valve having a second fluid chamber in communication with said one valve member to apply a force to said one valve member opposing said constant force when fluid under pressure is in said second chamber,
   (d) means defining a passage from said source of fluid under pressure to said second chamber and from said second chamber to the sump,
   (e) a second hydraulic valve remote from said motor connected in one of said passages and having a movable valve member to define a variable restriction therein, said second hydraulic valve having a lever to move the valve member thereof and change the pressure in said second chamber, said one valve member of the first hydraulic valve shifting from neutral relationship relative to the other valve member of the first hydraulic valve in response to an unbalance of said forces, (f) means responsive to movement of said one valve member to reduce the unbalance of said forces thereon, and (g) means to effect a mechanical connection between said other valve member and said one machine tool member after a predetermined movement of said one machine tool member to move said other valve member toward neutral relationship relative to said one valve member.

5. In a grinding machine, a hydraulic feed system for the remote control of relative feed movement between a wheelhead member and a workpiece supporting member comprising:

(a) a hydraulic motor connected to one of said members to effect movement thereof relative to the other of said members, (b) a source of fluid under pressure and a sump, (c) a first hydraulic valve hydraulically connected between the motor and the source of fluid under pressure, said valve having a ported sleeve received therein and a plunger having spaced spools slidably received in the sleeve, said sleeve and said plunger positionable relative to each other in neutral relationship to stop the motor, said valve having a first fluid chamber in communication with said sleeve and connected to the source of fluid under pressure to apply a constant force against said sleeve, said valve having a second fluid chamber in communication with the sleeve and connected to the source of fluid under pressure to apply a force to said sleeve opposing said constant force, (d) means defining a passage from said second chamber to the sump, (e) a second hydraulic valve remote from said motor connected in said passage and having a movable valve member to define a variable restriction therein, said second hydraulic valve having a lever to move the valve member thereof and change the pressure in said second chamber, said sleeve shifting from neutral relationship relative to the plunger in response to an unbalance of said forces, (f) means responsive to movement of said sleeve to reduce the unbalance of said forces thereon, and (g) means to effect a mechanical connection between said plunger and said one grinding machine member after a predetermined movement of said one grinding machine member to move said plunger toward neutral relationship relative to said sleeve.

6. In a grinding machine, a hydraulic feed system for the remote control of relative feed movement between a wheelhead member and a workpiece supporting member comprising:

(a) a hydraulic motor connected to one of said members to effect movement thereof relative to the other of said members, (b) a source of fluid under pressure and a sump, (c) a first hydraulic valve hydraulically connected between the motor and the source of fluid under pressure, said valve having (1) a housing, (2) a ported sleeve slidably received in the housing and defining a first slot therewith, (3) a plunger having spaced spools slidably received in the sleeve, said sleeve and said plunger positionable relative to each other in neutral relationship to stop the motor, (4) a first fluid chamber in communication with said sleeve and connected to the source of fluid under pressure to apply a constant force against said sleeve, (5) and a second fluid chamber in communication with said the sleeve and connected through said first slot to the source of fluid under pressure to apply a force to said sleeve opposing said constant force, (d) a second hydraulic valve remote from said motor and having a housing, said second hydraulic valve having a movable valve member slidably received in said housing and defining a second slot therewith, (e) means defining a passage from said second chamber through said second slot to said sump, (f) a lever connected to said movable valve member of said second hydraulic valve to move the valve member and alter the effective length of said second slot to thereby change the pressure in said second chamber and create an unbalance of the forces on said sleeve, said unbalance effecting movement of the sleeve and alteration of said first slot until said forces are balanced, and (g) means to effect a mechanical connection between said plunger and said one grinding machine member after a predetermined movement of said one grinding machine member to move said plunger toward neutral relationship relative to said sleeve.

7. A hydraulic system for controlled movement of a machine tool member comprising in combination:

(a) a hydraulic motor connected to said member to effect movement thereof, (b) a first hydraulic valve in circuit with the motor and defining a throttle valve therefor, (c) a second hydraulic valve in circuit with the throttle valve and the motor and having two movable members positionable relative to each other in neutral relationship to stop the flow of hydraulic fluid between the motor and the throttle valve to stop the motor, (d) a third hydraulic valve having a movable valve member, said third hydraulic valve hydraulically connected to said second hydraulic valve to displace one of the valve members thereof from neutral relationship with the other valve member thereof on displacement of the valve member of the third hydraulic valve, and (e) means to move said other valve member of the second hydraulic valve toward neutral relationship with said one valve member thereof in response to movement of said machine tool member after a predetermined movement of the machine tool member.

8. A hydraulic system for controlled movement of a machine tool member comprising in combination:

(a) a hydraulic motor connected to said member to effect movement thereof, (b) a first hydraulic valve in circuit with the motor and defining a throttle valve therefor, (c) a second hydraulic valve in circuit with the throttle valve and the motor and having two movable members positionable relative to each other in neutral relationship to stop the flow of hydraulic fluid between the motor and the throttle valve to stop the motor, said second hydraulic valve operable to permit flow of hydraulic fluid between the motor and the throttle valve for operation of the motor at a rate determined by the throttle valve when one of said valve members is displaced from said neutral relationship relative to the other valve member, (d) a source of fluid under pressure, (e) means including at least one fluid chamber connected to the source of fluid under pressure and in communication with one of the valve members of the second hydraulic valve to apply opposing forces to said one valve member, (f) a third hydraulic valve hydraulically connected to said chamber and operable to alter the pressure therein and create an unbalance of said opposing forces, said one valve member of the second hydraulic valve shifting from neutral relationship relative to the other valve member thereof in response to an unbalance of said forces to render the throttle valve effective, (g) means responsive to movement of said one valve member of the second hydraulic valve to reduce the unbalance of said forces thereon, and (h) means to effect connection between said machine tool member and said other valve member of the second hydraulic valve after predetermined movement of said machine tool member to move said other valve member of the second hydraulic valve toward neutral relationship with said one valve member thereof.

9. A hydraulic feed system for the remote manual control of relative feed movement between a tool carrying member and a workpiece supporting member in a machine tool comprising:

(a) a hydraulic motor connected to one of said members to effect movement thereof relative to the other of said members, (b) a first hydraulic valve in circuit with the motor and defining a throttle valve therefor, (c) a second hydraulic valve in circuit with the throttle valve and the motor and having two movable valve members positionable relative to each other in neutral relationship to stop the flow of hydraulic fluid between the motor and the throttle valve to stop the motor, said second hydraulic valve operable to permit flow of hydraulic fluid between the motor and the throttle valve for operation of the motor at a rate determined by the throttle valve when one of said valve members is displaced from said neutral relationship relative to the other valve member, said valve having a fluid chamber in communication with one of said valve members, (d) a source of fluid under pressure and a sump, (e) means defining a passage from the source of fluid under pressure to said chamber and defining a passage from said chamber to said sump, (f) means providing a force on said one valve member of said second hydraulic valve opposing the force applied thereto by fluid in said chamber, (g) a third hydraulic valve remote from said motor connected in one of said passages and having a movable valve member to define a variable restriction therein, said third hydraulic valve having a lever to move the valve member thereof and change the pressure in said chamber, said one valve member of the second hydraulic valve shifting from neutral relationship relative to the other valve member thereof in response to an unbalance of said opposing forces to render said throttle valve effective, (h) means responsive to movement of said one valve member of the second hydraulic valve to reduce the unbalance of said forces thereon, and (i) means to effect a mechanical connection between said other valve member of the second hydraulic valve and said one machine tool member after a predetermined movement of said one machine tool member to move said other valve member of the second hydraulic valve toward neutral relationship relative to said one valve member thereof.

10. A hydraulic feed system for the remote manual control of relative feed movement between a tool carrying member and a workpiece supporting member in a machine tool comprising:

(a) a hydraulic motor connected to one of said members to effect movement thereof relative to the other of said members, (b) a source of fluid under pressure and a sump, (c) a first hydraulic valve having a movable valve member in circuit with the motor and defining a throttle valve for the motor, (d) a second hydraulic valve in circuit with the throttle valve and the motor and having two movable valve members positionable relative to each other in neutral relationship to stop the flow of hydraulic fluid between the motor and the throttle valve to stop the motor, said second hydraulic valve operable to permit flow of hydraulic fluid between the motor and the throttle valve for operation of the motor at a rate determined by the position of the movable valve member of the throttle valve when one of said valve members of the second hydraulic valve is displaced from said neutral relationship relative to the other of said valve members thereof, said valve having a first fluid chamber in communication with said one valve member and connected to the source of fluid under pressure to apply a constant force against said one valve member, said valve having a second fluid chamber in communication with said one valve member to apply a force to said one valve member opposing said constant force when fluid under pressure is in said second chamber, (e) means defining a passage from said source of fluid under pressure to said second chamber and from said second chamber to the sump, (f) a third hydraulic valve remote from said motor connected in one of said passages and having a movable valve member to define a variable restriction therein, said third hydraulic valve having a lever to move the valve member thereof and change the pressure in said second chamber, said one valve member of the second hydraulic valve shifting from neutral relationship relative to the other valve member of the second hydraulic valve in response to an unbalance of said forces to render the throttle valve effective, (g) means responsive to movement of said one valve member of the second hydraulic valve to reduce the unbalance of said forces thereon and bring said one valve member of the second hydraulic valve to a predetermined position when said lever is moved to a predetermined position, (h) means to control movement of the valve member of the throttle valve when said one valve member of the second hydraulic valve is in said predetermined position to effect rapid advance of said one machine tool member, and (i) means to effect a mechanical connection between said other valve member of the second hydraulic valve and said one machine tool member after a predetermined rapid advance movement of said one machine tool member to move said other valve member of the second hydraulic valve toward neutral relationship relative to said one valve member thereof.

11. In a grinding machine, a hydraulic feed system for the remote control of relative feed movement between a wheelhead member and a workpiece supporting member comprising:

(a) a hydraulic motor connected to one of said members to effect movement thereof relative to the other of said members, (b) a source of fluid under pressure and a sump, (c) a first hydraulic valve having a movable valve member in circuit with the motor and defining a throttle valve therefor, (d) a second hydraulic valve in circuit with the throttle valve and the motor, said valve having a ported sleeve received therein and a plunger having spaced spools slidably received in the sleeve, said sleeve and said plunger positionable relative to each other in neutral relationship to stop the flow of hydraulic fluid between the throttle valve and the motor to stop the motor, said valve operable to permit flow of hydraulic fluid between the throttle valve and the motor for operation of the motor at a rate determined by the position of the movable valve member of the throttle valve when one of said valve members is displaced from said neutral relationship relative to the other of said valve members, said valve having a first fluid chamber in communication with said sleeve and connected to the source of fluid under pressure to apply a constant force against said sleeve, said valve having a second fluid chamber in communication with the sleeve and connected to the source of fluid under pressure to apply a force to said sleeve opposing said constant force,
(e) means defining a passage from said second chamber to the sump,
(f) a third hydraulic valve remote from said motor connected in said passage and having a movable valve member to define a variable restriction therein, said valve member effective when moved to change the pressure in said second chamber and displace said sleeve from neutral relationship relative to the plunger,
(g) a lever movable in one direction to move the movable valve member of the third hydraulic valve and movable transversely to said direction to move the movable valve member of the first hydraulic valve,
(h) means responsive to movement of said sleeve to reduce the unbalance of said forces thereon and bring said sleeve to a predetermined position displaced from neutral relationship with said other valve member when said lever is moved in said one direction to a predetermined position, said throttle valve effective on transverse movement of said lever at said predetermined position to effect rapid advance of said one machine tool member,
(i) and means to effect a mechanical connection between said other valve member of the second hydraulic valve and said one grinding machine member after a predetermined rapid advance movement of said one grinding machine member to move said other valve member of the second hydraulic valve toward neutral relationship relative to said one valve member thereof.

12. In a grinding machine, a hydraulic feed system for the remote control of relative feed movement between a wheelhead member and a workpiece supporting member comprising:
(a) a hydraulic motor connected to one of said members to effect movement thereof relative to the other of said members,
(b) a source of fluid under pressure and a sump,
(c) a first hydraulic valve having a movable valve member in circuit with the motor and defining a throttle valve therefor,
(d) a second hydraulic valve in circuit with the throttle valve and the motor, said valve having
  (1) a housing,
  (2) a ported sleeve slidably received in the housing and defining a first slot therewith,
  (3) a plunger having spaced spools slidably received in the sleeve, said sleeve and said plunger positionable relative to each other in neutral relationship to stop the flow of hydraulic fluid between the throttle valve and the motor to stop the motor, said valve operable to permit flow of hydraulic fluid between the throttle valve and the motor for operation of the motor at a rate determined by the position of the movable valve member of the throttle valve when one of said valve members of the second hydraulic valve is displaced from said neutral relationship relative to the other of said valve members thereof,
  (4) a first fluid chamber in communication with said sleeve and connected to the source of fluid under pressure to apply a constant force against said sleeve, and
  (5) a second fluid chamber in communication with the sleeve and connected through said first slot to the source of fluid under pressure to apply a force to said sleeve opposing said constant force,
(e) a third hydraulic valve remote from said motor and having a housing, said third hydraulic valve having a movable valve member slidably received in said housing and defining a second slot therewith,
(f) means defining a passage from said second chamber through said second slot to said sump,
(g) a lever connected to said movable valve member of said third hydraulic valve and movable in one direction to alter the effective length of said second slot to thereby change the pressure in said second chamber and create an unbalance of the forces on said sleeve, said unbalance effecting movement of the sleeve and alteration of said first slot until said forces are balanced, a small predetermined movement of said lever in said one direction displacing said sleeve to render said throttle valve effective, said lever connected to the movable valve member of the throttle valve and movable transversely to said one direction to effect rapid advance of said one machine tool member at a controlled rate,
(h) means to effect a mechanical connection between said plunger and said one grinding machine member after a predeetrmined movement of said one grinding machine member to move said plunger toward neutral relationship relative to said sleeve,
(i) and means to hold said movable member of the throttle valve in a predetermined open position as said lever is moved further in said one direction for feed movement of said one grinding machine member.

13. A hydraulic feed system for the remote control of a machine tool member comprising:
(a) a hydraulic motor connected to said member to effect movement thereof,
(b) a first hydraulic valve connected in circuit with the motor having two movable valve members positionable relative to each other in neutral relationship to stop the motor, said valve operable to effect operation of the motor when one of said valve members is displaced from said neutral relationship relative to the other valve member,
(c) a second hydraulic valve having a movable valve member and hydraulically connected to said first hydraulic valve to displace one of said valve members of the first hydraulic valve on displacement of the valve members of the second hydraulic valve to run the motor and move the machine tool member at a rate determined by the displacement of the valve member of the second valve,
(d) means to effect engagement between the machine tool member and the other valve member of the first hydraulic valve after a predetermined movement of the machine tool member to displace said other valve member and bring it into neutral relationship with said one valve member to stop the motor, whereby further movement of the valve member of said second hydraulic valve effects a movement of the machine tool member proportional to said further movement.

References Cited in the file of this patent
UNITED STATES PATENTS
1,143,034    Brown _____ _____ June 15, 1915
2,758,426    Comstock _____ Aug. 14, 1956